(12) United States Patent
Wang et al.

(10) Patent No.: US 12,634,590 B2
(45) Date of Patent: May 19, 2026

(54) IMAGE ADJUSTMENT METHOD AND IMAGE SENSING SYSTEM

(71) Applicant: MEDIATEK INC., Hsin-Chu (TW)

(72) Inventors: Jan-Wei Wang, Hsinchu City (TW);
Huei-Han Jhuang, Hsinchu City (TW);
Po-Yu Huang, Hsinchu City (TW);
Ying-Jui Chen, Hsinchu City (TW);
Chi-Cheng Ju, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 294 days.

(21) Appl. No.: 18/373,987

(22) Filed: Sep. 28, 2023

(65) Prior Publication Data

US 2025/0113108 A1 Apr. 3, 2025

(51) Int. Cl.
| | |
|---|---|
| *H04N 23/76* | (2023.01) |
| *G06T 5/70* | (2024.01) |
| *G06T 7/11* | (2017.01) |
| *G06T 7/246* | (2017.01) |
| *G06T 7/73* | (2017.01) |
| *H04N 23/68* | (2023.01) |
| *H04N 23/745* | (2023.01) |

(52) U.S. Cl.
CPC .............. *H04N 23/76* (2023.01); *G06T 5/70* (2024.01); *G06T 7/11* (2017.01); *G06T 7/248* (2017.01); *G06T 7/74* (2017.01); *H04N*

*23/6811* (2023.01); *H04N 23/683* (2023.01); *H04N 23/745* (2023.01); *G06T 2207/20021* (2013.01)

(58) Field of Classification Search
CPC .......................... H04N 23/76; H04N 23/6811
See application file for complete search history.

(56) References Cited

U.S. PATENT DOCUMENTS

| | | | | |
|---|---|---|---|---|
| 11,310,440 B2 * | 4/2022 | Otsuki | .................. | H04N 23/71 |
| 2020/0036904 A1 * | 1/2020 | Otsuki | ..................... | H04N 7/18 |
| 2021/0150250 A1 * | 5/2021 | Kimura | .................. | G06V 10/50 |
| 2025/0113108 A1 * | 4/2025 | Wang | ........................ | G06T 7/74 |

* cited by examiner

*Primary Examiner* — Cynthia Calderon
(74) *Attorney, Agent, or Firm* — Winston Hsu

(57) ABSTRACT

An image adjustment method, applied to an image sensing system comprising an image sensor, comprising: (a) sensing a target image by the image sensor; (b) dividing the target image to a plurality of image regions; (c) acquiring location information of at least one first target feature in the image regions; (d) computing brightness information of each of the image regions; (e) generating adjustment curves according to the brightness information and according to required brightness values of each of the image regions; and (f) adjusting brightness values of the image regions according to the adjustment curves. The step (d) adjusts the brightness information according to the location information or the step (e) adjusts the adjustment curves according to the location information.

22 Claims, 6 Drawing Sheets

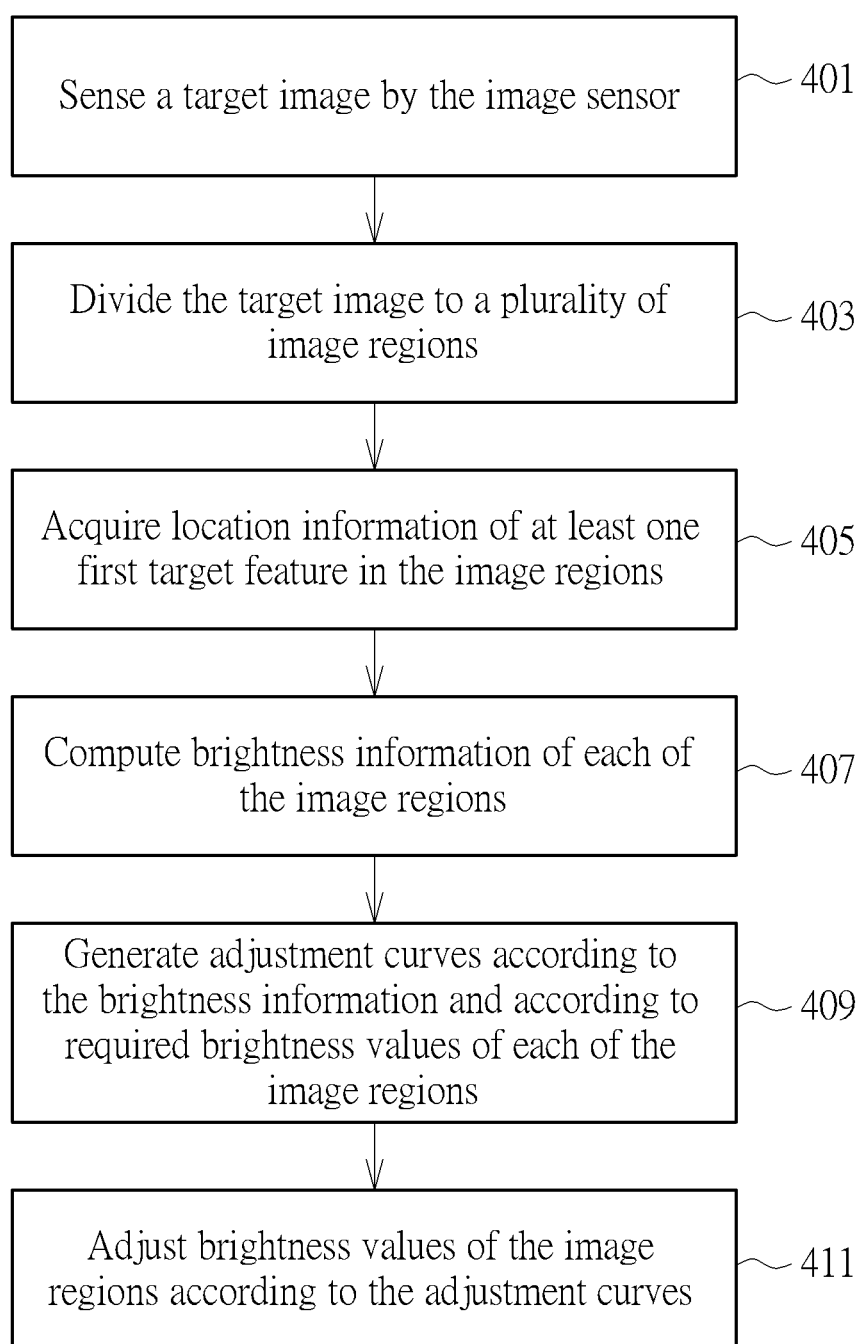

Sense a target image by the image sensor ~ 401

Divide the target image to a plurality of image regions ~ 403

Acquire location information of at least one first target feature in the image regions ~ 405

Compute brightness information of each of the image regions ~ 407

Generate adjustment curves according to the brightness information and according to required brightness values of each of the image regions ~ 409

Adjust brightness values of the image regions according to the adjustment curves ~ 411

FIG. 4

IMAGE ADJUSTMENT METHOD AND IMAGE SENSING SYSTEM

BACKGROUND

Conventionally, a local tone curve mapping is always used to adjust brightness of images, such that the images may have required characteristics such as better dynamic ranges or better contrasts. However, during the local tone curve mapping, the locations of the contents (e.g., objects) in images may change, thus the local tone curves which are used for adjusting brightness values of the images may be non-ideal. If such issue is not compensated, flickers of a video generated based on the adjusted images may occur, and such flickers may be worse if image stabilization is performed to the video.

SUMMARY

One objective of the present application is to provide an image adjustment method which can reduce flicker caused by the local tone curve mapping.

Another objective of the present application is to provide an image sensing system which can reduce flicker caused by the local tone curve mapping.

One embodiment of the present application discloses an image adjustment method, applied to an image sensing system comprising an image sensor, comprising: (a) sensing a target image by the image sensor; (b) dividing the target image to a plurality of image regions; (c) acquiring location information of at least one first target feature in the image regions; (d) computing brightness information of each of the image regions; (e) generating adjustment curves according to the brightness information and according to required brightness values of each of the image regions; and (f) adjusting brightness values of the image regions according to the adjustment curves. The step (d) adjusts the brightness information according to the location information or the step (e) adjusts the adjustment curves according to the location information.

Another embodiment of the present application discloses an image sensing system, comprising an image sensor and a processing circuit. The processing circuit is configured to perform following steps: (a) sensing a target image by the image sensor; (b) dividing the target image to a plurality of image regions; (c) acquiring location information of at least one first target feature in the image regions; (d) computing brightness information of each of the image regions; (e) generating adjustment curves according to the brightness information and according to required brightness values of each of the image regions; and (f) adjusting brightness values of the image regions according to the adjustment curves. The step (d) adjusts the brightness information according to the location information or the step (e) adjusts the adjustment curves according to the location information.

In view of above-mentioned embodiments, the flickers caused by the local tone curve mapping can be reduced, since at least one step of the local tone curve mapping is compensated according to location in formation of image features.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a flow chart illustrating an image adjustment method according to one embodiment of the present application.

DETAILED DESCRIPTION

Several embodiments are provided in following descriptions to explain the concept of the present invention. The methods in following descriptions can be executed by programs stored in a non-transitory computer readable recording medium such as a hard disk, an optical disc or a memory. Additionally, the term "first", "second", "third" in following descriptions are only for the purpose of distinguishing different one elements, and do not mean the sequence of the elements. For example, a first device and a second device only mean these devices can have the same structure but are different devices.

Figure 1:
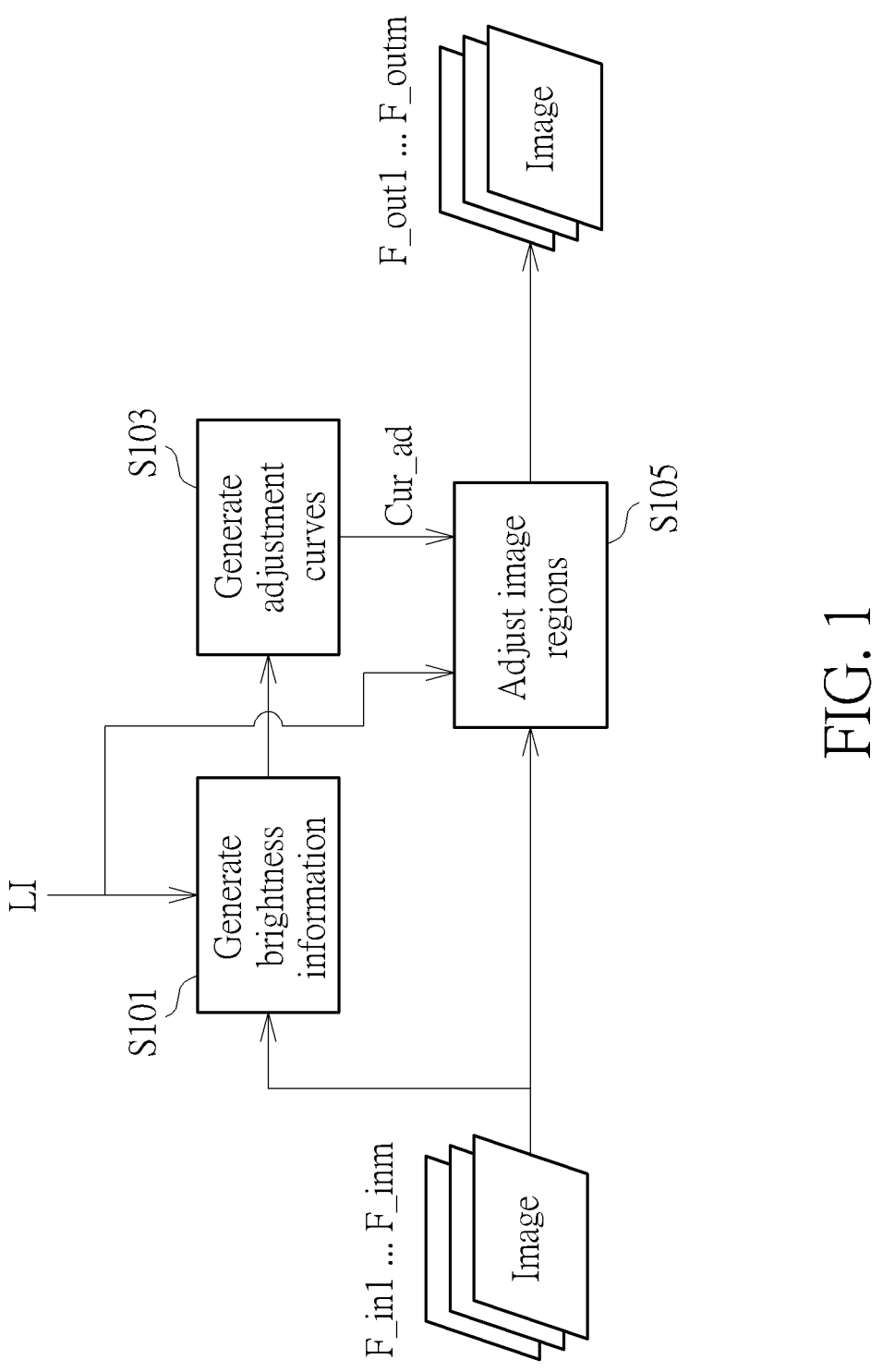
FIG. 1 is a schematic diagram illustrating an image adjustment method according to one embodiment of the present application.

FIG. 1 is a schematic diagram illustrating an image adjustment method according to one embodiment of the present application. The image adjustment method is applied to an image sensing system (e.g., a camera) comprising an image sensor. As shown in FIG. 1, a plurality of input images F_in1 .... F_inm are sensed by the image sensor. Also, the location information LI of at least one feature respectively in the input images F_in1 .... F_inm is acquired. In the step S101, brightness information of the input images F_in1 .... F_inm is computed. The brightness information can be, for example, an average of brightness value, a maximum brightness value, a minimum brightness value or a distribution of brightness values. Also, the feature comprises at least one of: an object, an edge, a texture, or any specific shape which can be tracked in the input images F_in1 .... F_inm. For example, the feature comprises objects and edges of the input images F_in1 .... F_inm.

In the step S103, adjustment curves Cur_ad are generated according to the brightness information and according to required brightness values. In the step S105, brightness values of the input images F_in1 .... F_inm are adjusted according to the adjustment curves Cur_ad, to generate output images F_out1 .... F_outm. In the embodiment of FIG. 1, the step S101 further adjusts the brightness information according to the location information LI or the step S103 further adjusts the adjustment curves Cur_ad according to the location information LI. More specifically, in one embodiment, only one of the step S101 and the step S103 is performed according to the location information LI. In another embodiment, both of the step S101 and the step S103 are performed according to the location information LI.

Figure 2:
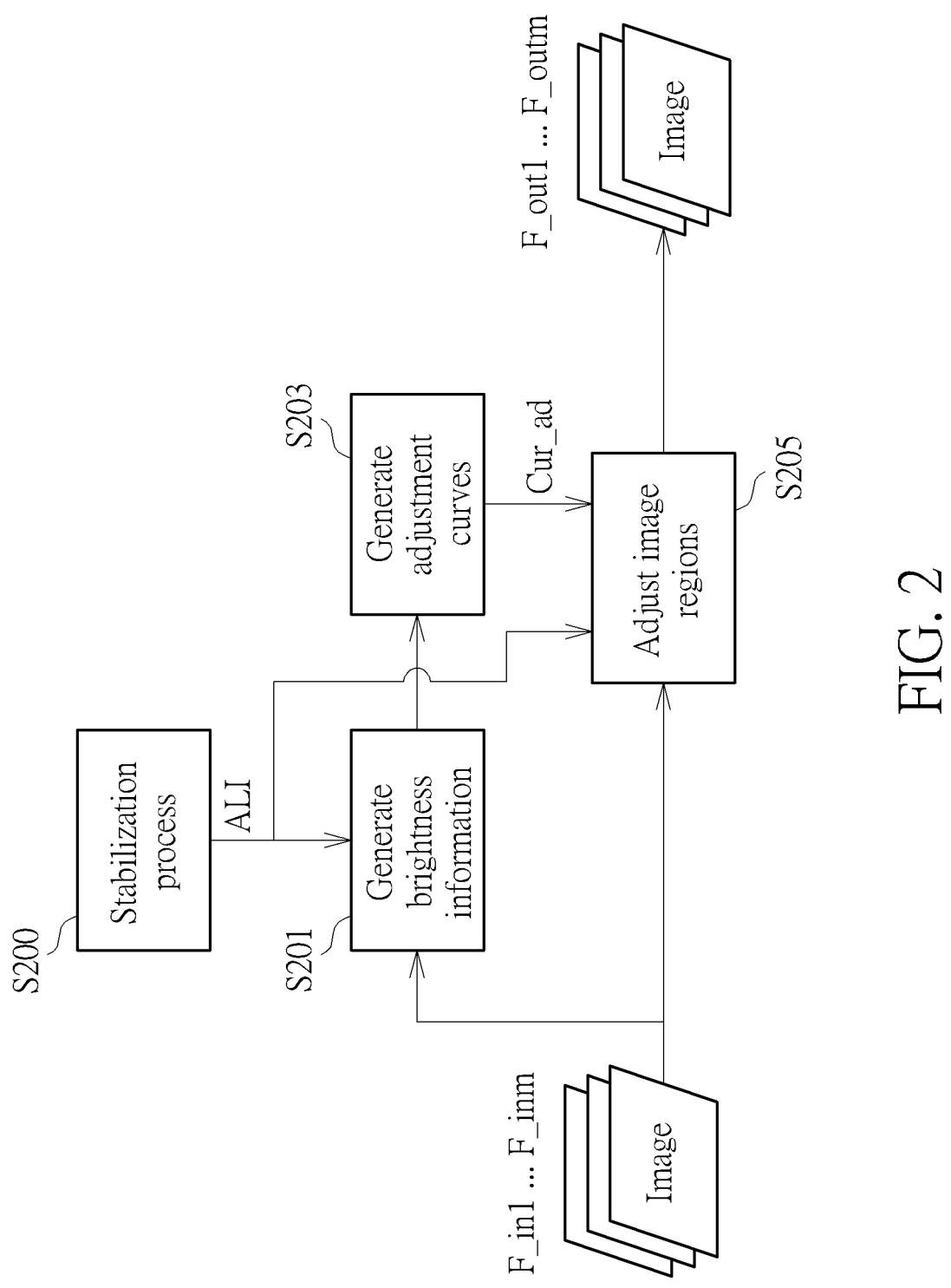
FIG. 2 is a schematic diagram illustrating an image adjustment method according to another embodiment of the present application.

FIG. 2 is a schematic diagram illustrating an image adjustment method according to another embodiment of the present application. In one embodiment, the location information LI is alignment information ALI generated by a stabilization process S200, as shown in FIG. 2. Further, in following embodiments, the image adjustment method illustrated in FIG. 2 is implemented by a local tone curve mapping. In such case, in the step S201 which corresponds to the step S101 in FIG. 1, each of the input images F_in1 . . . . F_inm is divided into a plurality of image regions (e.g., blocks), and brightness information of each of the image regions is computed.

In one embodiment, in the step S201, brightness histograms are used for computing the brightness information. Brightness histograms may comprise brightness distribution data for the pixels within image regions of the image across multiple brightness levels. For example, a brightness histogram may comprise a number of bins, and each of the bins corresponds to a different brightness range. The value for each bin may represent the percentage of pixels within the image region that have a brightness value within the brightness range corresponding to that bin. In other words, the brightness value is the brightness presentation of a corresponding pixel value.

Also, the step S203 in FIG. 2, which corresponds to the step S103 in FIG. 1, generates local tone curves as the adjustment curves Cur_ad. The adjustment in the step S205 of FIG. 2, which corresponds to the step 105 of FIG. 1, may be different corresponding to different requirements. For example, in one embodiment, a gain map using local tone curves and weighted bilateral interpolation is acquired. Such gain map is applied to color channels (for example, Bayer channel R, Gb, Gr, B) of the input images F_in1 . . . . F_inm to generate the output images F_out1 . . . . F_outm. In another embodiment, the local tone curves may represent the desired tonal range of the portion of image within the particular image block. For example, in one embodiment, the overall tonal range may be reduced in the output images F_out1 . . . . F_outm as compared to input image F_in1 . . . . F_inm. In another embodiment, the overall range may be the same, but individual brightness levels may be adjusted within the image. However, the adjustments of the steps S205 are not limited to these examples.

Figure 3:
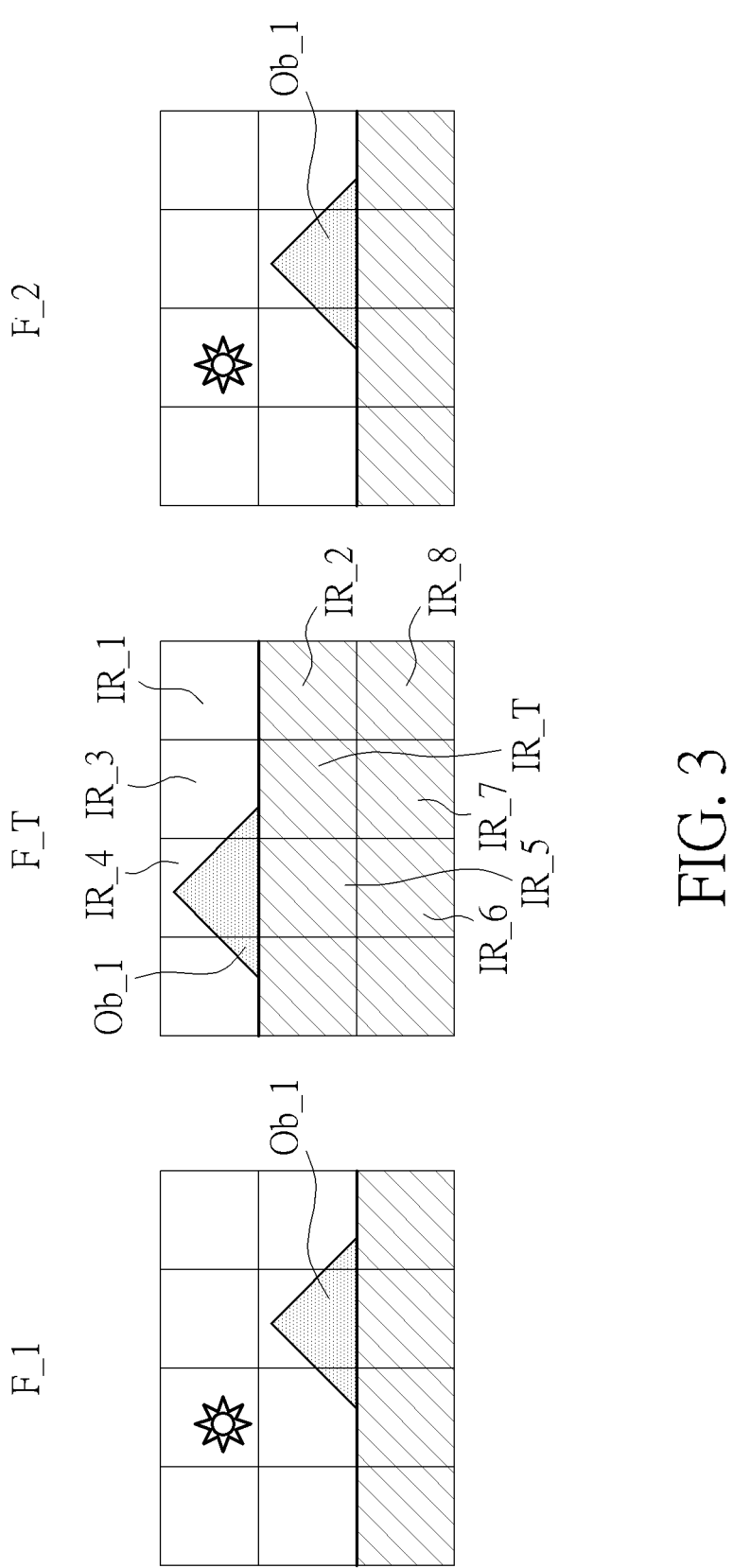
FIG. 3 is a schematic diagram illustrating an example of an image processed by the image adjustment method in FIG. 2, according to one embodiment of the present application.

Details of the steps illustrated in FIG. 2 will be described in following descriptions, by referring FIG. 3. Please note, the following descriptions related the steps S201, S203 and S205 in FIG. 2 and FIG. 3 can also be implemented for the steps S101, S103 and S105 in FIG. 1. FIG. 3 is a schematic diagram illustrating an example of an image processed by the image adjustment method in FIG. 2, according to one embodiment of the present application.

The image adjustment method is applied to an image sensing system comprising an image sensor. As shown in FIG. 3, a target image F_T is sensed by the image sensor, and the target image F_T is divided to a plurality of image regions (e.g., blocks). Image regions IR_1-IR_8 and IR_T are symbolized as an example for explaining. In one embodiment, alignment information ALI of at least one first target feature in the image regions IR_1, IR_2, IR_3 is acquired from the image stabilization method in the step S200. The first target feature comprises at least one of: an object, an edge, a texture, or any specific shape in the target image F_T. For example, the first target feature comprises the object Ob 1 in the target image F_T.

Then, brightness information of each of the image regions IR_1, IR_2, IR_3, and IR_T is computed by the step S201. Adjustment curves Cur_ad are generated according to the brightness information and according to required brightness values of each of the image regions IR_1, IR_2, IR_3, and IR_T, for example, by the step S203. Afterwards, brightness values of the image regions IR_1, IR_2, IR_3, and IR_T are adjusted according to the adjustment curves, for example, by the step S205. As above-mentioned, the step S201 may adjust the brightness information according to the alignment information ALI, or the step S203 may adjust the adjustment curves Cur_ad according to the alignment information ALI. In the embodiment of FIG. 3, both steps are performed according to the alignment information ALI.

In the embodiment of FIG. 2 and FIG. 3, the alignment information ALI is at least one motion vector (e.g., displacements or angular momentum) of features, which is generated by the image stabilization method. Accordingly, in the embodiment of FIG. 3, the motion vector of the first target feature is acquired according to the target image F_T and a first image F_1 which is a previous image of the target image F_T. Please note, in another embodiment, the motion vector can also be acquired according to other algorithms rather than limited to the image stabilization process. Additionally, the location information LI in FIG. 1 and the alignment information ALI can represent different types of data instead of just motion vectors.

In the embodiment of FIG. 3, the object Ob 1 in the first image F_1 moves upward in the target image F_T and then moves downward in a second image F 2 following the target image F_T. If the step S201 and the step S205 do not perform adjustment responding to such movement, the above-mentioned flicker issue in related art may occur. Accordingly, in the present application, after acquiring the motion vector, the step S201 adjusts the brightness information according to the motion vectors and the step S205 adjusts the adjustment curves according to the motion vectors. Detail steps of the adjustments in steps S201 and S205 are described below.

In one embodiment, the step S201 computes weighting values for the brightness information according to the motion vector, and adjusts the brightness information according to the weighting values. As above-mentioned, in the step S201, brightness histograms may be used for computing the brightness information. Also, the brightness histogram may comprise a number of bins, and each of the bins corresponds to a different brightness range. In such case, the weighting values may be used for the values of bins.

In one embodiment, the step S201 further computes the weighting values of the brightness information of at least portion of a target image region according to the weighting values of the brightness information of at least one neighboring image region of the target image region. For example, in the embodiment of FIG. 3, weighting values of the brightness information of at least portion of a target image region IR_T are computed according to the weighting values of the brightness information of neighboring image regions IR_1, IR_2, IR_3 of the target image region IR_T.

Such step can be represented as following Equation (1):

$$MCSTATt = \text{weighted average}$$

$$(STATt\{\lfloor MV(i)\rfloor, \lfloor MV(j)\rfloor\}, STATt\{\lfloor MV(i)\rfloor + 1, \lfloor MV(j)\rfloor\},$$

$$STATt\{\lfloor MV(i)\rfloor, \lfloor MV(j)\rfloor + 1\},$$

$$STATt\{\lfloor MV(i)\rfloor + 1, \lfloor MV(j)\rfloor + 1\})$$

Equation (1)

STATt{⌊MV(i)⌋, ⌊MV(j)⌋} means weighting values of the brightness information of the target image region IR_T in FIG. 3. Also, STATt{⌊MV(i)⌋+1, ⌊MV(j)⌋}, STATt {⌊MV(i)⌋, ⌊MV(j)⌋+1}, STATt{⌊MV(i)⌋+1, ⌊MV(j)⌋+1} respectively means weighting values of the brightness information of the neighboring image regions IR_2, IR_3, IR_1. Besides, the MCSTATt means a weighting value which is really used for the target image region IR_T.

In Equation (1), weighting values of the brightness information of at least portion of the target image region IR_T are computed according to the weighting values of the brightness information of neighboring image regions IR_1, IR_2, IR_3 of the target image region IR_T. For the convenience of explaining, such step is simplified as "brightness information of at least portion of the target image region IR_T are weighted according to brightness information of the neighboring image regions IR_1, IR_2, IR_3". In one embodiment, the brightness information of the upper right area of the target image region IR_T is weighted according to the brightness information of the neighboring image regions IR_1, IR_2, IR_3.

Such method can also be applied to other portions of the target image region IR_T. For example, in one embodiment, brightness information of all areas of the target image region IR_T are weighted according to brightness information of the neighboring image regions IR_1-IR_8, which are surrounding the target image region IR_T. In another embodiment, brightness information of a lower left area of the target image region IR_T is weighted according to brightness information of the neighboring image regions IR_5-IR_7.

In another example, the step S201 further computes the weighting values corresponding to the current image according the weighting values corresponding to at least one previous image of the current image and according to a smoothness coefficient that is introduced by comparing the current image with the at least one previous image. For example, the step S201 further computes the weighting values corresponding to the target image F_T according the weighting values corresponding to the first image F_1 and according to a smoothness coefficient.

Such step can be represented as following Equation (2):

$$STAT_t[i, j] = \alpha STAT_{t-1}[i, j] + (1 - \alpha)MCSTAT_t \qquad \text{Equation (2)}$$

STAT$_{t-1}$[i, j] means weighting values which are acquired from a previous image of the current image and MCSTATt means weighting values which are acquired according to the current image. Also, STAT$_t$[i, j] means weighting values which are really used for the current image. Accordingly, the smoothness coefficient α, which may be between 0-1, means a level that the weighting values of the current image refer to a previous image. If the smoothness coefficient α is close to 0, it means the weighting values of the current image are more determined by weighting values thereof. On the opposite, if the smoothness coefficient α is close to 1, it means the weighting values of the current image are more determined by weighting values of the previous image. Please note, STAT$_t$[i, j] can be acquired according to more than one previous image rather than limited to one previous image illustrated in the Equation (2).

In one embodiment, the smoothness coefficient α is a constant value. In another embodiment, the smoothness coefficient α is adjusted according to an image condition of the current image. For example, if brightness of the previous image or the current image is too dark or out of focus, the motion vectors which are acquired according to the current image may be incorrect. In such case, the smoothness coefficient α may be set to be close to 1. On the opposite, if the current image has a high contrast and distinctive features, the motion vectors which are acquired according to the current image may be more precise. Accordingly, the smoothness coefficient α may be set to be close to 0.

The step S203 may have similar steps. In one embodiment, the step S203 further adjusts the weighting values of the adjustment curves Cur_ad of at least portion of a target image region according to the weighting values of the adjustment curves Cur_ad of at least one neighboring image region of the target image region. For example, in the embodiment of FIG. 3, weighting values of the adjustment curves Cur_ad of a target image region IR_T are computed according to the weighting values of the adjustment curves Cur_ad of neighboring image regions IR_1, IR_2, IR_3 of the target image region IR_T. Such step can be represented as following Equation (3):

$$MCCURVEt = \qquad \text{Equation (3)}$$

weighted average (CURVEt{⌊MV (i)⌋, ⌊MV (j)⌋}, CURVEt

{⌊MV (i)⌋ + 1, ⌊MV (j)⌋}, CURVEt{⌊MV (i)⌋, ⌊MV (j)⌋ + 1},

CURVEt{⌊MV (i)⌋ + 1, ⌊MV (j)⌋ + 1})

CURVEt{⌊MV(i)⌋, ⌊MV(j)⌋} means weighting values of the adjustment curve of the target image region IR_T. Also, CURVEt{⌊MV(i)⌋+1, ⌊MV(j)⌋}, CURVEt{⌊MV(i)⌋, ⌊MV(j)⌋+1}, CURVEt{⌊MV(i)⌋+1, ⌊MV(j)⌋+1}) respectively means weighting values of adjustment curves of the neighboring image regions IR_2, IR_3, IR_1. Also, the MCCURVEt means a weighting value which is used for the adjustment curve of target image region IR_T.

Similar with the example in Equation (1), the adjustment curves of at least portion of the target image region IR_T are weighted according to the adjustment curves of neighboring image regions IR_1, IR_2, IR_3 of the target image region IR_T. In one embodiment, the adjustment curves of the upper right area of the target image region IR_T is weighted according to the adjustment curves of the neighboring image regions IR_1, IR_2, IR_3.

Such method can also be applied to other portions of the target image region IR_T. For example, in one embodiment, adjustment curves of all areas of the target image region IR_T are weighted according to adjustment curves of the neighboring image regions IR_1-IR_8, which are surrounding the target image region IR_T. In another embodiment, adjustment curves of a lower left area of the target image region IR_T is weighted according to adjustment curves of the neighboring image regions IR_5-IR_7.

In another example, the step S203 further computes the weighting values corresponding to the current image according ing the weighting values corresponding to at least one previous image of the current image and according to a smoothness coefficient that is introduced by comparing the current image with the at least one previous image. For example, the step S203 further computes the weighting values corresponding to the target image F_T according the weighting values corresponding to the first image F_1 and according to a smoothness coefficient.

Such step can be represented as following Equation (4):

$$CURVE_t[i, j] = \alpha CURVE_{t-1}[i, j] + (1 - \alpha)MCCURVE_t \quad \text{Equation (4)}$$

$CURVE_{t-1}[i, j]$ means weighting values which are acquired from a previous image of the current image and CURVEt means weighting values which are acquired according to the current image. Also, $CURVE_t[i, j]$ means weighting values which are really used for the current image. Accordingly, the smoothness coefficient $\alpha$, which may be between 0-1, means a level that the weighting values of the current image refer to a previous image. If the smoothness coefficient $\alpha$ is close to 0, it means the weighting values of the current image are more determined by weighting values thereof. On the opposite, if the smoothness coefficient $\alpha$ is close to 1, it means the weighting values of the current image are more determined by weighting values of the previous image. Please note, $CURVE_t[i, j]$ can be acquired according to more than one previous image rather than limited to one previous image illustrated in the Equation (4).

In one embodiment, the smoothness coefficient $\alpha$ is a constant value. In another embodiment, the smoothness coefficient $\alpha$ is adjusted according to an image condition of the current image. Details of the image condition are described in above-mentioned embodiment, thus are omitted for brevity here.

Further, in above-mentioned embodiments, the alignment information ALI comprises the first alignment information which is generated according to at least one first target feature in the target image F_T and the first image F_1. In one embodiment, the first target feature has the same speed. In such example, the target image F_T and the first image F_1 may further comprise at least one second target feature which has a speed different from a speed of the first target feature. In such case, second alignment information of the second target feature is acquired according to the target image F_T and the first image F_1. For example, if the image adjustment method is applied to a video comprising a people walking on a side along a road and comprising a cat rapidly runs across the road, the first alignment information is generated according to images of the people, and the second alignment information is generated according to images of the cat. The step S201 may adjust the brightness information which corresponds to the second target feature according to the second alignment information or the step S203 may adjust the adjustment curve which corresponds to the second target feature according to the second alignment information.

In view of above-mentioned embodiments, an image adjustment method can be acquired. FIG. 4 is a flow chart illustrating an image adjustment method according to one embodiment of the present application. The image adjustment method is applied to an image sensing system comprising an image sensor and comprises following steps:

Step 401

Sense a target image (e.g., the target image F_T in FIG. 3) by the image sensor.

Step 403

Divide the target image to a plurality of image regions (e.g., blocks shown in FIG. 3).

Step 405

Acquire location information of at least one first target feature in the image regions.

In one embodiment, the location information is alignment information (e.g., motion vectors) from an image stabilization method.

Step 407

Compute brightness information of each of the image regions (e.g., the step S101 in FIG. 1 or the step S201 in FIG. 2).

Step 409

Generate adjustment curves according to the brightness information and according to required brightness values of each of the image regions (e.g., the step S103 in FIG. 1 or the step S203 in FIG. 2).

Step 411

Adjust brightness values of the image regions according to the adjustment curves (e.g., the step S105 in FIG. 1 or the step S205 in FIG. 2).

The step 407 adjusts the brightness information according to the location information or the step 409 adjusts the adjustment curves according to the location information. Other details steps can be acquired in view of above-mentioned embodiments, thus are omitted for brevity here.

Figure 5:
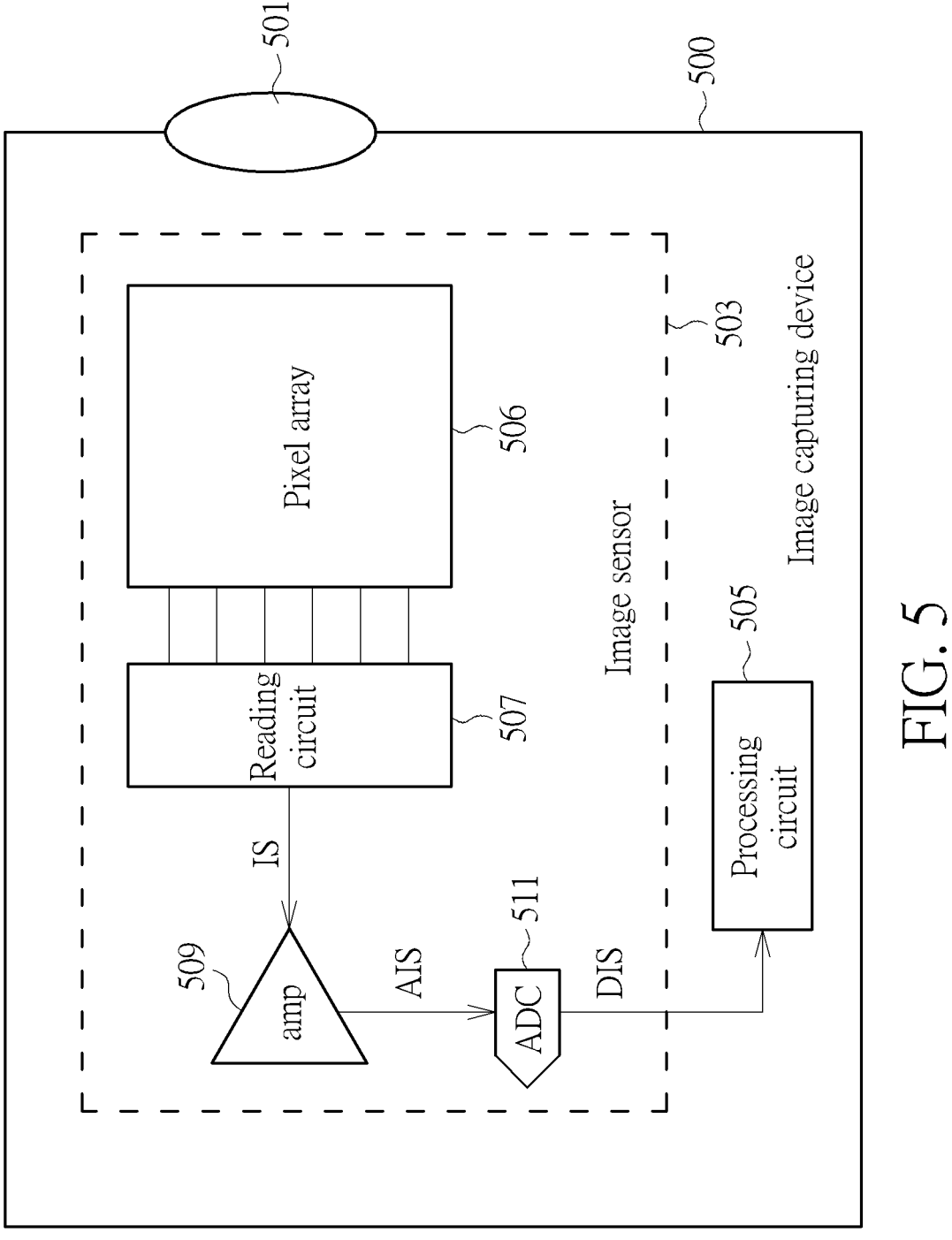
FIG. 5 is a block diagram illustrating an image sensing system, according to one embodiment of the present application.

The above-mentioned embodiments can be implemented by an image sensing system. FIG. 5 is a block diagram illustrating an image sensing system 500 according to one embodiment of the present application. It will be appreciated that the image adjustment method illustrated in above-mentioned embodiments is not limited to be implemented by the image sensing system 500 in FIG. 5. In one embodiment, the image sensing system 500 is a camera, and may be an independent electronic device or be integrated to another electronic device such as a mobile phone or a tablet computer.

As shown in FIG. 5, the image sensing system 500 comprises a lens 501, an image sensor 503 and a processing circuit 505. The image sensor 503 in FIG. 5 comprises a pixel array 506, a reading circuit 507, an image signal amplifying circuit 509, and an ADC 511. The pixel array 506 comprises a plurality of pixels which generate sensing charges corresponding to the received light passing through the lens 501. The reading circuit 507 is configured to read the charges to generate image signals (only using an image signal IS as an example for explaining) corresponding to the sensing charges generated by the pixels.

The image signal amplifying circuit 509 is configured to amplify the image signal IS to generate an amplified image signal AIS. The amplified image signal AIS is transmitted to an ADC 511 to generate a digital image signal DIS (the pixel values of the sensing image SI). The digital image signal DIS is transmitted to a processing circuit 505, which may perform the above-mentioned embodiments of the image adjustment method. The processing circuit 505 may be integrated to the image sensor 503 or independent from the image sensor 503.

Figure 6:
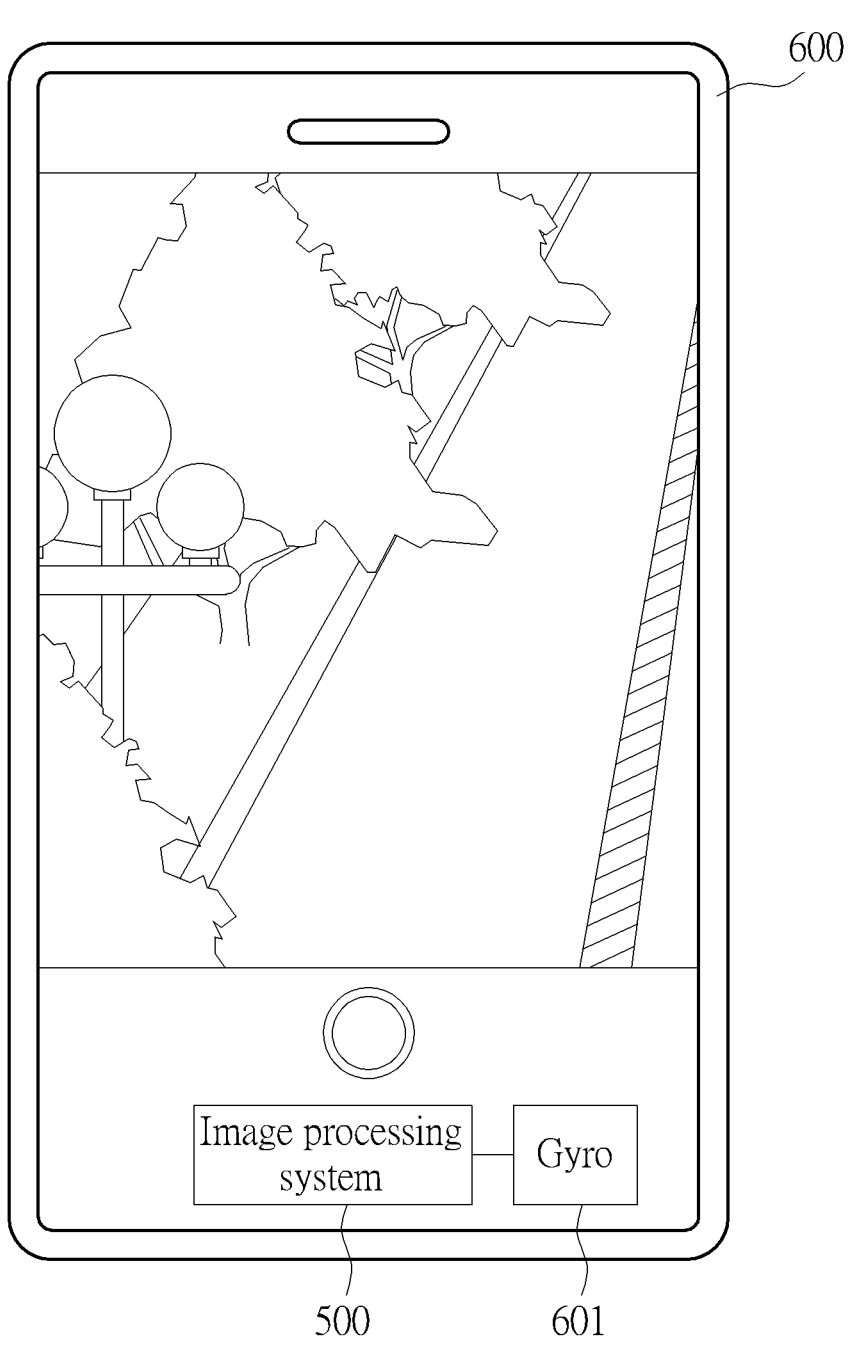
FIG. 6 is a block diagram illustrating an electronic device comprising the image sensing system illustrated in FIG. 5, according to one embodiment of the present application.

FIG. 6 is a block diagram illustrating an electronic device comprising the image sensing system illustrated in FIG. 5, according to one embodiment of the present application. As above-mentioned, the image sensing system 500 may be an independent electronic device or be integrated to another electronic device such as a mobile phone or a tablet computer. In the embodiment of FIG. 6, the image sensing system 500 is comprised in a mobile phone 600.

AS illustrated in FIG. 6, the mobile phone 600 comprises a motion sensor such as a gyroscope 601 and the above-mentioned image processing system 500. As above-mentioned, the motion vectors acquired in the image stabilization method can be angular momentum. In the embodiment of FIG. 6, the angular momentum is from the gyroscope 601.

If a user uses the mobile phone 600 to record a video while walking, the image processing system 500 may perform the above-mentioned image stabilization method and the image adjustment method to compensate the shaking of the video and to improve the video quality. Accordingly, the video recorded by the user may have less shaking and less flicker, since the video is processed by the image stabilization method and the image adjustment method. However, if the gyroscope 601 cannot operate normally, the image stabilization method and the image adjustment method disclosed in aforementioned embodiments may not be performed smoothly. In such case, the video recorded by the user may have more shaking since the image stabilization method does not work. Additionally, the videos recorded by the user may have more severe flickering due to the lack of alignment information from the image stabilization method, which make the image adjustment method ineffective.

In view of above-mentioned embodiments, the flickers caused by the local tone curve mapping can be reduced, since at least one step of the local tone curve mapping is compensated according to location in formation of image features.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image adjustment method, applied to an image sensing system comprising an image sensor, comprising:
   (a) sensing a target image by the image sensor;
   (b) dividing the target image to a plurality of image regions;
   (c) acquiring location information of at least one first target feature in the image regions;
   (d) computing brightness information of each of the image regions;
   (e) generating adjustment curves according to the brightness information and according to required brightness values of each of the image regions; and
   (f) adjusting brightness values of the image regions according to the adjustment curves;
   wherein the image adjustment method further comprises a step (d1) or a step (e1), wherein the step (d1) adjusts the brightness information according to the location information, wherein the step (e1) adjusts the adjustment curves according to the location information;
   wherein the image adjustment method further comprises:
   sensing a first image previous to the target image by the image sensor;
   acquiring first alignment information of the first target feature according to the target image and the first image;
   wherein the step (d1) adjusts the brightness information according to the first alignment information and the step (e1) adjusts the adjustment curves according to the first alignment information;
   wherein the first alignment information is at least one motion vector of the first target feature between the target image and the first image; and
   performing an image stabilization method to the target image;
   wherein the step (c) acquires the motion vector generated by the image stabilization method.

2. The image adjustment method of claim 1, wherein step (d) computes the brightness information according to the location information and the step (e) generates the adjustment curves according to the location information.

3. The image adjustment method of claim 1, wherein the step (d1) further comprises:
   computing weighting values for the brightness information according to the motion vector; and
   adjusting the brightness information according to the weighting values.

4. The image adjustment method of claim 3, wherein the step (d1) further computes the weighting values of the brightness information of a target image region according to the weighting values of the brightness information of at least one neighboring image region of the target image region.

5. The image adjustment method of claim 3, wherein the step (d1) further computes the weighting values corresponding to the current image according the weighting values corresponding to at least one previous image of the current image and according to a smoothness coefficient.

6. The image adjustment method of claim 5, further comprising:
   adjusting the smoothness coefficient according an image condition of the current image.

7. The image adjustment method of claim 1, wherein the step (e1) further comprises:
   computing weighting values for the adjustment curves according to the motion vector; and
   adjusting the adjustment curves according to the weighting values.

8. The image adjustment method of claim 7, wherein the step (e1) further computes the weighting values of one of the adjustment curve which corresponds a target image region according to the weighting values of the adjustment curves of at least one neighboring image region of the target image region.

9. The image adjustment method of claim 7, wherein the step (d1) further computes the weighting values corresponding to the current image according the weighting values corresponding to at least one previous image of the current image and according to a smoothness coefficient.

10. The image adjustment method of claim 9, further comprising:
   adjusting the smoothness coefficient according an image condition of the current image.

11. The image adjustment method of claim 1, further comprising:
   acquiring second alignment information of at second target feature according to the target image and the first image;
   wherein the step (d1) further adjusts the brightness information which corresponds to the second target feature according to the second alignment information and the step (e1) further adjusts the adjustment curve which corresponds to the second target feature according to the second alignment information;
   wherein the first target feature and the second target feature have different speed.

12. An image sensing system, comprising:
   an image sensor; and
   a processing circuit, configured to perform following steps:
   (a) sensing a target image by the image sensor;
   (b) dividing the target image to a plurality of image regions;
   (c) acquiring location information of at least one first target feature in the image regions;
   (d) computing brightness information of each of the image regions;

(e) generating adjustment curves according to the brightness information and according to required brightness values of each of the image regions; and (f) adjusting brightness values of the image regions according to the adjustment curves;

wherein the processing circuit is further configured to perform a step (d1) or a step (e1), wherein the step (d1) adjusts the brightness information according to the location information, wherein the step (e1) adjusts the adjustment curves according to the location information;

wherein the processing circuit is further configured to perform following steps:

sensing a first image previous to the target image by the image sensor;

acquiring first alignment information of the first target feature according to the target image and the first image;

wherein the step (d1) adjusts the brightness information according to the first alignment information and the step (e1) adjusts the adjustment curves according to the first alignment information;

wherein the first alignment information is at least one motion vector of the first target feature between the target image and the first image; and performing an image stabilization method to the target image;

wherein the step (c) acquires the motion vector generated by the image stabilization method.

13. The image sensing system of claim 12, wherein step (d) computes the brightness information according to the location information and the step (e) generates the adjustment curves according to the location information.

14. The image sensing system of claim 12, wherein the step (d1) further comprises:

computing weighting values for the brightness information according to the motion vector; and adjusting the brightness information according to the weighting values.

15. The image sensing system of claim 14, wherein the step (d1) further computes the weighting values of the brightness information of a target image region according to the weighting values of the brightness information of at least one neighboring image region of the target image region.

16. The image sensing system of claim 14, wherein the step (d1) further computes the weighting values corresponding to the current image according the weighting values corresponding to at least one previous image of the current image and according to a smoothness coefficient.

17. The image sensing system of claim 16, further comprising:

adjusting the smoothness coefficient according an image condition of the current image.

18. The image sensing system of claim 12, wherein the step (e1) further comprises:

computing weighting values for the adjustment curves according to the motion vector; and adjusting the adjustment curves according to the weighting values.

19. The image sensing system of claim 18, wherein the step (e1) further computes the weighting values of one of the adjustment curve which corresponds a target image region according to the weighting values of the adjustment curves of at least one neighboring image region of the target image region.

20. The image sensing system of claim 18, wherein the step (d1) further computes the weighting values corresponding to the current image according the weighting values corresponding to at least one previous image of the current image and according to a smoothness coefficient.

21. The image sensing system of claim 20, further comprising:

adjusting the smoothness coefficient according an image condition of the current image.

22. The image sensing system of claim 12, further comprising:

acquiring second alignment information of at second target feature according to the target image and the first image;

wherein the step (d1) further adjusts the brightness information which corresponds to the second target feature according to the second alignment information and the step (e1) further adjusts the adjustment curve which corresponds to the second target feature according to the second alignment information;

wherein the first target feature and the second target feature have different speed.

* * * * *